United States Patent [19]
Elliott

[11] Patent Number: 4,856,843
[45] Date of Patent: Aug. 15, 1989

[54] SIDE LOADING TRAILER BODY

[75] Inventor: John Elliott, Cobden, Canada

[73] Assignee: Herb Shaw & Sons Limited, Pembroke, Canada

[21] Appl. No.: 62,977

[22] Filed: Jun. 17, 1987

[51] Int. Cl.[4] ............................. B60P 3/42; E05C 3/04
[52] U.S. Cl. ..................................... 296/181; 296/26; 160/213; 292/202; 292/207
[58] Field of Search ................. 296/181, 182, 183, 26, 296/165, 171, 172, 175, 176, 146; 160/206, 213, 96; 292/101, 202, 207, DIG. 32; 312/290

[56] References Cited

U.S. PATENT DOCUMENTS

| | | | |
|---|---|---|---|
| 2,656,216 | 10/1953 | Bobroff | 296/26 X |
| 2,963,313 | 12/1960 | Bennett | 296/26 |
| 3,140,116 | 7/1964 | Speas | 296/26 X |
| 3,212,813 | 10/1965 | Peterson et al. | 296/176 |
| 3,363,932 | 1/1968 | Mann | 296/26 X |
| 3,378,323 | 4/1968 | Goldberg | 312/290 X |
| 3,567,271 | 3/1971 | Gostomski | 296/164 |
| 3,750,356 | 8/1973 | Morse | 160/96 X |
| 4,296,791 | 10/1981 | Chaumat et al. | 160/206 |
| 4,391,462 | 7/1983 | Loreal | 292/207 |
| 4,620,581 | 11/1986 | Wallace | 160/213 X |

FOREIGN PATENT DOCUMENTS

| | | | |
|---|---|---|---|
| 110439 | 5/1940 | Australia | 160/206 |
| 2591966 | 6/1987 | France | 296/181 |

*Primary Examiner*—Russell D. Stormer
*Attorney, Agent, or Firm*—Neuman, Williams, Anderson & Olson

[57] ABSTRACT

A trailer body for providing access to the trailer body interior for cargo loading and unloading. The trailer body comprises front, back and side walls, a roof and a platform enclosing the interior. The side walls are formed by side-opening doors each of which, when opened, exposes the interior along that entire side of the body for loading purposes. The roof is releasably secured to the tops of the walls. The roof may be raised, as required, from closed position on the tops of the walls to a position a predetermined distance above the tops of the walls. The trailer body, with the side doors open along one or both sides of the platform and the roof raised, permits easy cargo loading or unloading of the trailer body using a forklift vehicle.

12 Claims, 4 Drawing Sheets

SIDE LOADING TRAILER BODY

The present invention relates to a trailer body for providing easy access to the body interior for loading and unloading.

BACKGROUND OF THE INVENTION

The transport of cargos is often carried out using trucks with large trailers. Conventionally the cargos for such trailers are loaded using forklift vehicles. Because of the construction of conventional, completely enclosed trailer bodies, it is extremely difficult to fully load such trailer bodies with heavy, bulky commodities such as lumber. The doorways, roofs and side and end walls of such conventional trailer bodies provide obstructions which require, for full loading, a precision of handling and placement of the cargo which simply cannot be achieved by even the most skilled of forklift operators.

Traditionally such commodities have been loaded onto open, flatbed trailers where such obstructions are not found. As well, such open flatbed trailers allow for greater ease of loading of customers' orders when more than one drop off point is involved. The use of such open, flatbed trailers however requires the loads to be secured on the flatbed and completely covered with tarpaulins to minimize the chance of debris flying off of the trailer during transportation. Such a conventional method of transporting commodities such as lumber creates additional truck down time since the load must be uncovered and recovered with the tarpaulin at each stop. As well, it is difficult to maintain the load in a clean state, free from road grime and safety problems such as spills and upset resulting from shifting loads may occur. There is also a danger on an open flatbed trailer of stacking the load to a height greater than is safe or greater than highway height restrictions might permit.

Some of these difficulties have been partially addressed in the prior art. For example, Fredin U.S. Pat. No. 4,489.975 issued Dec. 25, 1984 describes and illustrates a trailer having front, back and side walls circumscribing a platform, in which one of the sidewalls may be swung upwardly to completely open the side for loading and unloading. This construction requires a fairly complicated pivot arrangement for the whole side wall. Furthermore, this arrangement does not provide for a completely enclosed trailer body: it has no roof and would still require tarpaulin coverage of many types of cargo. Canadian Pat. No. 755,511 of Chieger et al issued Mar. 28, 1967 describes and illustrates a system of removable side racks for a flatbed trailer. Canadian Pat. Nos. 644,734 of Bitterman et al issued July 10, 1962 and 1,212,139 of Broadbent issued Sept. 30, 1986 describe alternative constructions of side loading trailer bodies, Bitterman et al teaching a system of sliding doors along the sides of the trailer platform and Broadbent teaching a folding, curtain-like side construction for the trailer body which can be collapsed to open a portion of the side of the trailer body for loading.

It is an object of the present invention to provide an improved construction completely enclosable trailer body which will permit easy loading and unloading thereof from the side.

SUMMARY OF THE INVENTION

In accordance with the present invention there is provided a trailer body for providing access to the trailer body interior for cargo loading and unloading. The trailer body comprises front, back and side walls, a roof and a platform enclosing the interior. The side walls are formed by side-opening doors each of which, when open, exposes the interior along that entire side of the body for loading purposes. The roof is releasably secured to the top of the walls. Means are provided for raising, as required, the roof from closed position on top of the walls to a position a predetermined distance above the top of the walls.

In a preferred embodiment of the present invention, vertically oriented channel means extend downwardly from the tops of the walls. Guide posts are secured to the roof and extend downwardly therefrom. The guide posts are positioned to slidably engage the channel means during raising and lowering of the roof with respect to the tops of the walls. The means for raising the roof preferably comprises a pair of simultaneously or independently operable double action air cylinders, one associated with the front and the other with the back wall of the trailer body and controllable to independently or simultaneously lift the front and rear edges of the roof. In the event one edge sticks the other cylinder will raise its end of the roof independently, allowing some leverage to free the frozen edge.

The trailer body in accordance with the present invention permits easy loading from the side of heavy, bulky commodities such as lumber, thereby eliminating the need for covering loads with tarpaulins, and allowing for greater ease in the off-loading of customers' orders when more than one drop off point is involved. Since the load is completely enclosed by the trailer body, the load is maintained in a clean state during transportation. The fact that the load is completely enclosed during transportation significantly increases the safety of transportation of such commodities by reducing spills and upset due to shifting loads. As well, those shipping cargos such as lumber in trailers according to this invention can be assured that height restrictions will be adhered to by workers loading the trailer, since the height to which cargo is stacked on the trailer is of necessity limited by the height of the trailer roof when resting in lowered position on the tops of the walls.

BRIEF DESCRIPTION OF THE DRAWINGS

These and other objects and advantages of the invention will become apparent upon reading the following detailed description and upon referring to the drawings in which.

Figure 1:
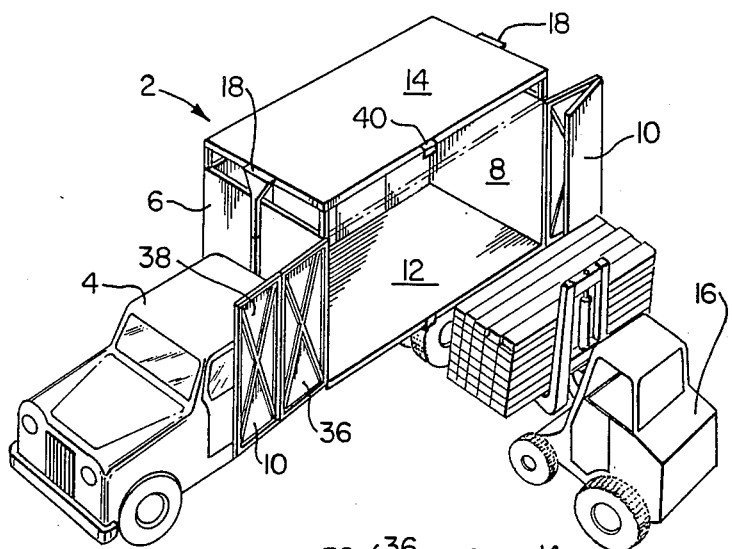
FIG. 1 is a perspective view of an example embodiment of a truck with a trailer body in accordance with the present invention with its roof in raised position as it is being loaded by a forklift vehicle.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Figure 2:
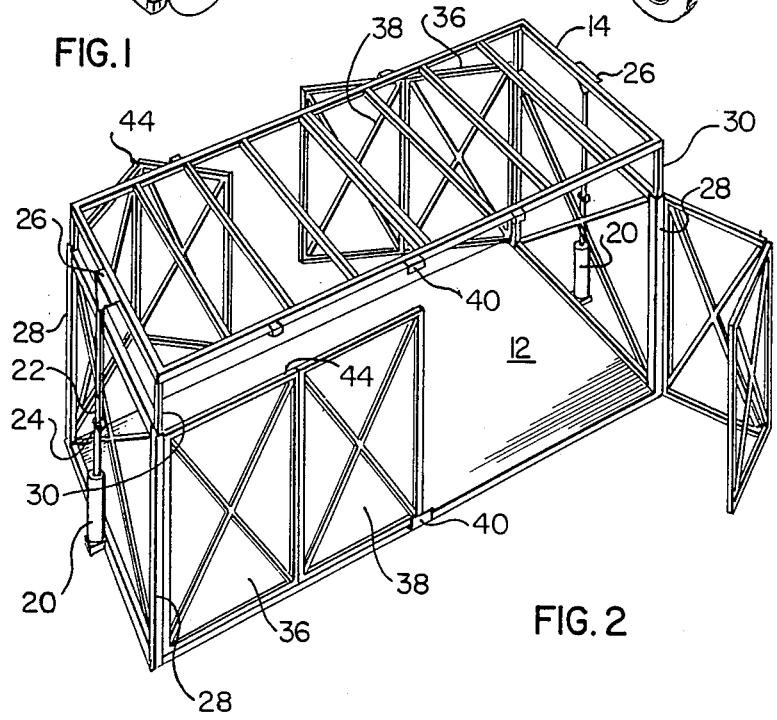
FIG. 2 is a perspective view of the skeletal construction of the trailer body of FIG. 1.

Turning to FIGS. 1 and 2, there is illustrated a preferred form of truck trailer body 2 in accordance with the present invention. (Of course, body 2 may be an integral part of truck 4 as illustrated, or a detachable trailer portion for a trailer cab.) Trailer body 2 is made up of a front wall 6, a back wall 8 and side walls which are formed by cooperating pairs of bi-fold doors 10 on either side, these walls circumscribing a platform 12 and supporting, on their top, a roof 14. The roof has been redesigned from the conventional 6" to 8" I beam support system and is only $1\frac{1}{8}$" thick. This provides an extra 6" approximately, of load space. This allows the use of 2" to 4" pile bottoms 15 for forklift fork clearance under each lift of lumber. As can be seen, when bi-fold doors 10 along one side are open, they completely expose the interior of trailer body 2 for purposes of loading. As can be seen in FIG. 1 a stack of lumber is being loaded into the interior of trailer body 2 by means of a forklift vehicle 16.

To facilitate the loading of trailer body 2, not only do doors 10 open as illustrated to expose the interior of the truck body along its entire side, roof 14 is lifted at both ends by lifting means 18 (which will be described in more detail hereinafter). In the illustrated embodiment, the roof in raised position is intended to provide the necessary clearance for a forklift operator to load the trailer two 49" lifts or three 31" lifts high. Doors 10 are intended to be held open using, for example, a short length of chain and clip (not illustrated) to keep them from blowing in the wind. As can be seen in FIGS. 1 and 2, the forklift operator has easy access to either side of the trailer body interior as was the case previously with traditional flatbed trailers.

Figure 6A:
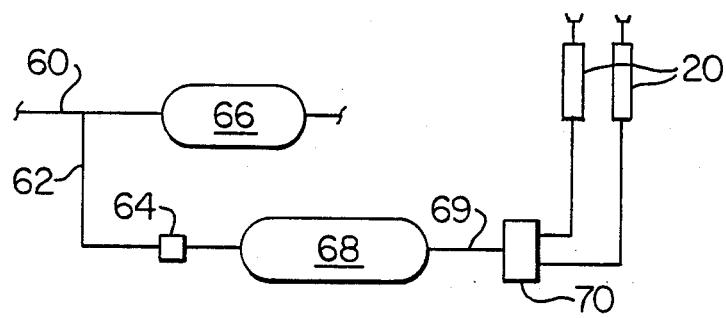
FIGS. 6a and 6b are schematic views of example embodiments of air systems to raise and lower the roof of the trailer body of the present invention.
Figure 6B:
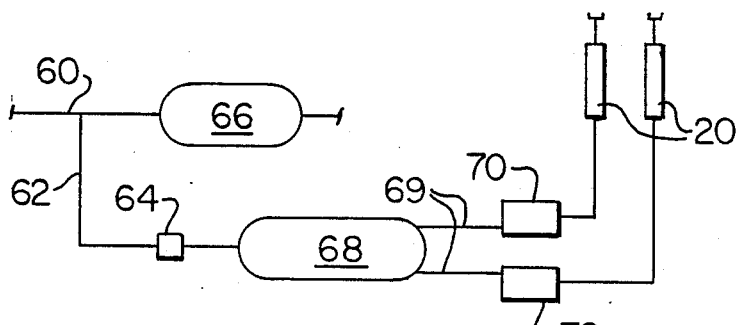

FIG. 2 illustrates the elements of trailer body in more detail. Means 18 for raising, as required, the roof from closed position (phantom, FIG. 1) supported on the tops of front wall 6, back wall 8 and side doors 10, to raised position as illustrated, comprises a pair of double action pneumatic air cylinders 20, one mounted on each of front wall 6 and back wall 8. Each cylinder 20 may be operated by air lines 69 and two-way (up and down) control valves 70 (FIGS. 6a and 6b) allowing both ends to be raised simultaneously, or if one ends sticks still allowing the opposite end to raise and hopefully free the frozen end. The use of air cylinders allows one end of the roof to be raised at a time (FIG. 3), this permits the operator to free the roof from constraints such as ice seal which may build up in the winter time. The air cylinders 20 raise or lower the roof by means of a connecting piece of channel iron 22 guided by appropriate support brackets 24 and welded onto the roof frame at junction 26.

Figure 4:
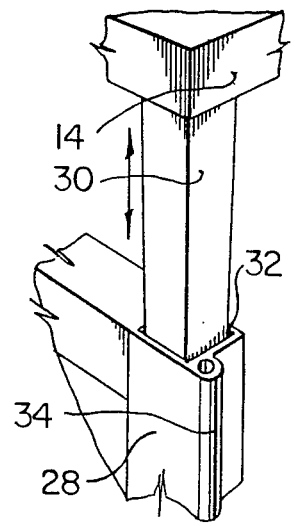
FIG. 4 is a detail perspective view of the guidance system for the roof during its raising or lowering.

Front and back walls 8 are supported by 3" metal tubing side posts 28 mounted at each corner of platform 12. Tapered $2\frac{1}{2}$" metal tubing guides 30 (best seen in FIG. 4) downwardly depend from the corners of roof 14 to slidably ride in channel 32 of the 3" metal tubing during raising or lowering of roof 14. This arrangement of guides 30 and roof lifting means 18 permits vertical lifting of the roof 14 with respect to the top edges of front and rear walls 6 and 8 and side doors 10, of about fourteen inches.

Hinges 34 (FIG. 4) for bi-fold doors 10 are also mounted on end posts 28. These bi-fold doors 10 are constructed so that the section 36 which is hinged to post 28 is wider than the other section 38, allowing complete folding of the bi-fold doors away from the trailer platform 12.

Figure 5:
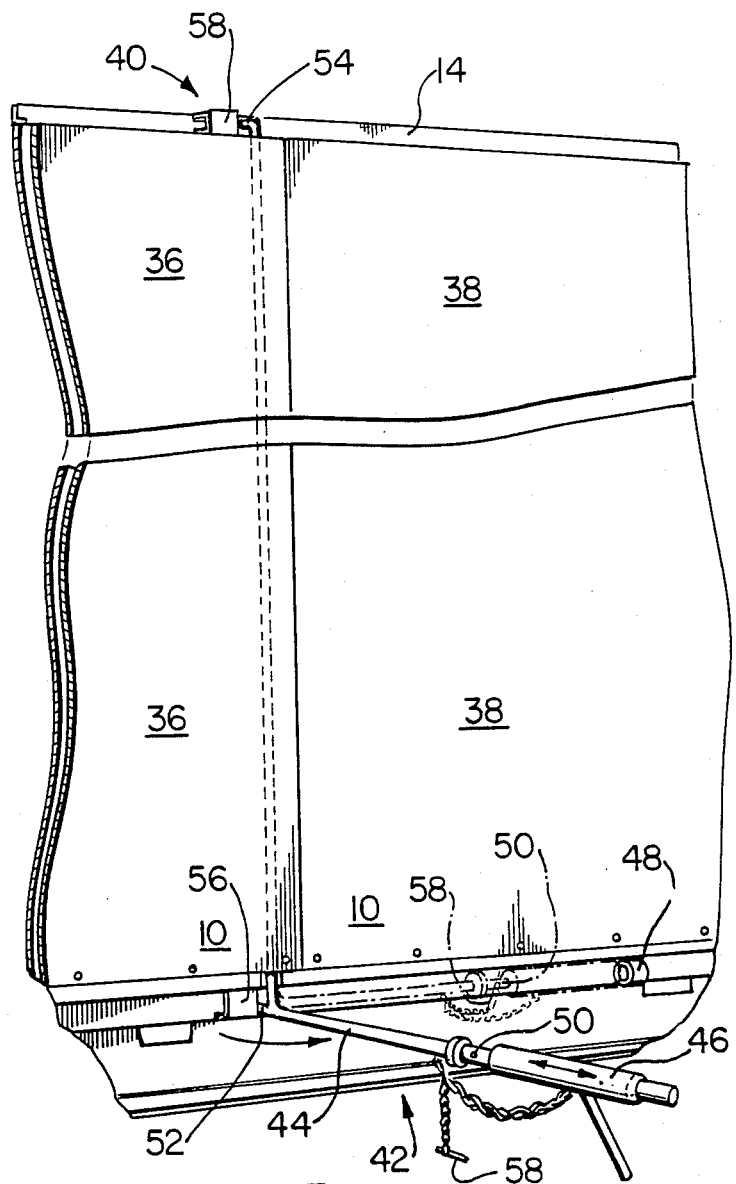
FIG. 5 is a perspective detail view of an example system for locking the side doors and roof of the trailer body in accordance with the present invention.

When the doors are closed, the upper and lower leading edges of the door on each section 38 slide into appropriate stops 40 (FIGS. 1 and 2) on the roof and platform to prevent the unintentional opening of the doors and secure these sections of the doors 10 in closed position. A door latch 42 (FIG. 5), flush with the side of the truck when the latch is locking the door section in closed position, is associated with the central edges of door sections 36 to permit opening of these sections of the doors and to free roof 14 to be raised and lock it when lowered. Latch 42 includes a bar 44 which pivots open away from the door. When pushed tight to the door it acts to lock roof 14 in lowered, closed position and the door 36 to the trailer deck. Locking hasp 46 slides on the lower, horizontal portion of bar 44 and locks in a barrel 48 welded to the frame of trailer body 2 by means of a pin or padlock inserted into a locking hole 50 in bar 44 as illustrated. In this locked position, hasp 46 maintains rod 44 in its closed locking position with respect to roof 14 while at the same time holding door 10 in closed position. By sliding hasp 46 away from barrel 48, and pivoting the bar 44 away from the trailer (in the horizontal plane), the door and roof are thereby unlocked for opening. The lower end of bar 44 pivots in the horizontal plane. Extensions 52 at the bottom and 54 at the top fit behind, respectively, deck clasp 56 and roof clasp 58 to force the central portions of the door section into closed position along the side of the truck. This is accomplished by a lever action, the horizontal portion of bar 44 acting as a lever arm pivoting about the vertical section thereof and extensions 52 and 54 pivoting into place and bearing against respective deck clasp 54 and roof clasp 56 to force the door sections into this closed position when the horizontal portion of bar 44 is in position as shown in phantom in FIG. 5. When hasp 46 is then slid into barrel 48, and the locking pin 58 inserted into hole 50 to prevent movement of hasp 46 away from barrel 48, the door is then firmly locked in closed position until such time as pin 58 is removed.

It will be understood that, as well, when upper extension 52 is in position behind roof clasp 54, roof 14 is locked against upward movement. Thus, this lock arrangement permits the roof to be unlocked and raised before opening the doors, or the doors to be opened by roof 14 is raised.

Figure 3:
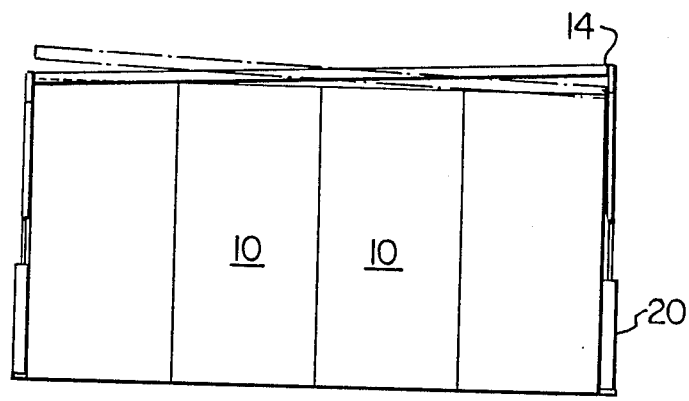
FIG. 3 is a schematic side view of a trailer body in accordance with the present invention showing different orientations of the roof which can be achieved.

In operation, when loading, the doors 10 are opened to unlock roof 14 which is then raised using air pressure along line 62, drawn from the truck's emergency line 60 (constant air supply) through a one way valve 64 (to prevent drainage of the truck's emergency air reservoir 66) into a separate reservoir tank 68 for the roof cylinders 20. Air is then drawn from this reservoir through operation of a control valve 70 to raise or lower the roof cylinders. Separate valves 70 may be used for each cylinder, or the operator may control the cylinder by simply kinking its related air line. Forklift operators have easy access to both sides of the box as previously described herein. When loading is complete, traditional load binders are employed to fix the cargo to the trailer platform 12. The roof 14 is lowered and then locked into place by closing and locking doors 10. Significantly reduced time and loading and unloading of cargos is evident when a trailer body 2 in accordance with the present invention is used. When delivering an order, this process is repeated, thus eliminating the time consuming and dirty job of removing and replacing a tarpaulin. The use of air cylinders 20 allows an operator to free the roof from constraints such as ice seal in winter by allowing either end of the roof to independently raise and lower, should the opposite end become stuck (FIG. 3). This indepdent operation of cylinders can be achieved by separate control valves 70 or by the operator kinking air line hose.

Thus it is apparent that there has been provided in accordance with the invention a side loading trailer body that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim of my invention:

1. A trailer body for providing access to the trailer body interior for cargo loading and unloading, comprising front, back and side walls, a roof and a platform enclosing the interior, the side walls comprising doors opening to the front and back, each of which, when opened, exposing the interior along that entire side of the body for loading purposes, the roof releasably secured to the tops of the walls, means for raising, as required, the roof from closed position on tops of the walls to a position a predetermined distance above the tops of the walls, tubular posts provided on either side of the front and back walls as support frames for those walls, and wherein each of the doors is a bi-fold door and has two sections, one section of each being hinged to a corresponding post, that section being wider than the other section to allow for complete folding of the door away from the trailer platform when the doors are open.

2. A trailer body according to claim 1 wherein vertically oriented channel means extend downwardly from the tops of the walls, and guide posts are secured to the roof and extend downwardly therefrom, the guide posts being positioned to be slidably seated within the channel means during raising and lowering of the roof with respect to the tops of the walls.

3. A trailer body according to claim 2 wherein pneumatic means are associated with the trailer body to lift the roof with respect to the tops of the walls.

4. A trailer body according to claim 3 wherein air cylinders are mounted on the front and back walls to permit lifting of the roof independently at either end or simultaneously at both ends.

5. A trailer body according to claim 4 wherein means are provided for independent actuation of the air cylinders to raise the roof or an end thereof.

6. A trailer body according to claim 4 wherein the doors and roof are provided with lock means to releasably secure the roof in closed position when the doors are closed.

7. A trailer body according to claim 1 wherein the doors and roof are provided with lock means to releasably secure the roof in closed position when the doors are closed.

8. A trailer body according to claim 2 wherein the upper ends of the posts provide the vertically oriented channel means.

9. A trailer body for providing access to the trailer body interior for cargo loading and unloading, comprising front, back and side walls, a roof and a platform enclosing the interior, each of said side walls having a top and comprising doors opening to the front and back, each of said doors having a top and, when opened, exposing the interior along that entire side of said trailer body for loading purposes, said roof releasably secured immediately adjacent said tops of said doors, securing means operatively associated with said platform, doors and roof for releasably securing said roof in position on said tops of said doors and securing said doors in closed position on the sides of said platform, means for raising, as required, said roof from closed position on tops of said walls to a position a predetermined distance above said tops of said walls, whereby, when said roof is in such raised position, increased unobstructed access to the interior of said trailer body from the side is provided, tubular posts provided on either side of said front and back walls as support frames for those walls, and wherein each of said doors is a bi-fold door and has two sections, one section of each being hinged to a corresponding post, that section being wider than the other section to allow for complete folding of said door away from said trailer platform when said doors are open.

10. A trailer body according to claim 9, wherein said securing means comprises a bar vertically extending through a portion of a corresponding door, means to pivot said bar secured to a lower end of said bar, and cooperating lock means, releasable on pivoting of said bar, secured to a portion of said roof and platform and respectively to adjacent upper and lower portions of said bar.

11. A trailer body according to claim 10, wherein said cooperating lock means comprise stops secured to said roof and platform along their sides and cooperating latches, releasably securable on pivoting of said bar within said stops, said latches secured to corresponding upper and lower portions of said bar.

12. A trailer body according to claim 11, wherein said means to pivot the bar comprises a handle secured to a lower portion of said bar, cooperating securing means secured to said handle and to said platform to releasably secure said handle against pivoting flush with the side of said platform when said latches are in locking position in said stops.

* * * * *